US012664043B2

(12) United States Patent
Dar et al.

(10) Patent No.: US 12,664,043 B2
(45) Date of Patent: Jun. 23, 2026

(54) SYSTEM AND METHOD FOR DETECTING AND FILTERING HARMFUL AND INCORRECT DATA FROM TELEMETRY STREAMS

(71) Applicant: Dell Products L.P., Round Rock, TX (US)

(72) Inventors: Shaul Dar, Petach Tikva (IL); Arun Rameshbabu, Torbay (CA); Midhudev Kodiyath, Kannur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/924,493

(22) Filed: Oct. 23, 2024

(65) Prior Publication Data

US 2026/0111303 A1      Apr. 23, 2026

(51) Int. Cl.
G06F 11/00          (2006.01)
G06F 11/07          (2006.01)
(52) U.S. Cl.
CPC ...... G06F 11/0793 (2013.01); G06F 11/0709 (2013.01)

(58) Field of Classification Search
CPC ......................... G06F 11/0793; G06F 11/0709
See application file for complete search history.

(56) References Cited

U.S. PATENT DOCUMENTS

| | | | | |
|---|---|---|---|---|
| 11,314,584 | B1 * | 4/2022 | Munigala | G06F 11/0793 |
| 2009/0271664 | A1 * | 10/2009 | Haas | G06F 11/008 |
| | | | | 714/48 |
| 2019/0370610 | A1 * | 12/2019 | Batoukov | G06F 11/0709 |
| 2020/0387797 | A1 * | 12/2020 | Ryan | G06F 17/18 |

* cited by examiner

*Primary Examiner* — Jason B Bryan
(74) *Attorney, Agent, or Firm* — Brian J. Colandreo; Heath M. Sargeant; Holland & Knight LLP

(57)          ABSTRACT

A method, computer program product, and computing system for receiving a telemetry data stream associated with a storage system. An erroneous portion of the telemetry data stream is identified by processing the telemetry data stream using an error detection process. The erroneous portion of the telemetry data stream is filtered by removing the erroneous portion of the telemetry data stream from the telemetry data stream.

11 Claims, 5 Drawing Sheets

10

10

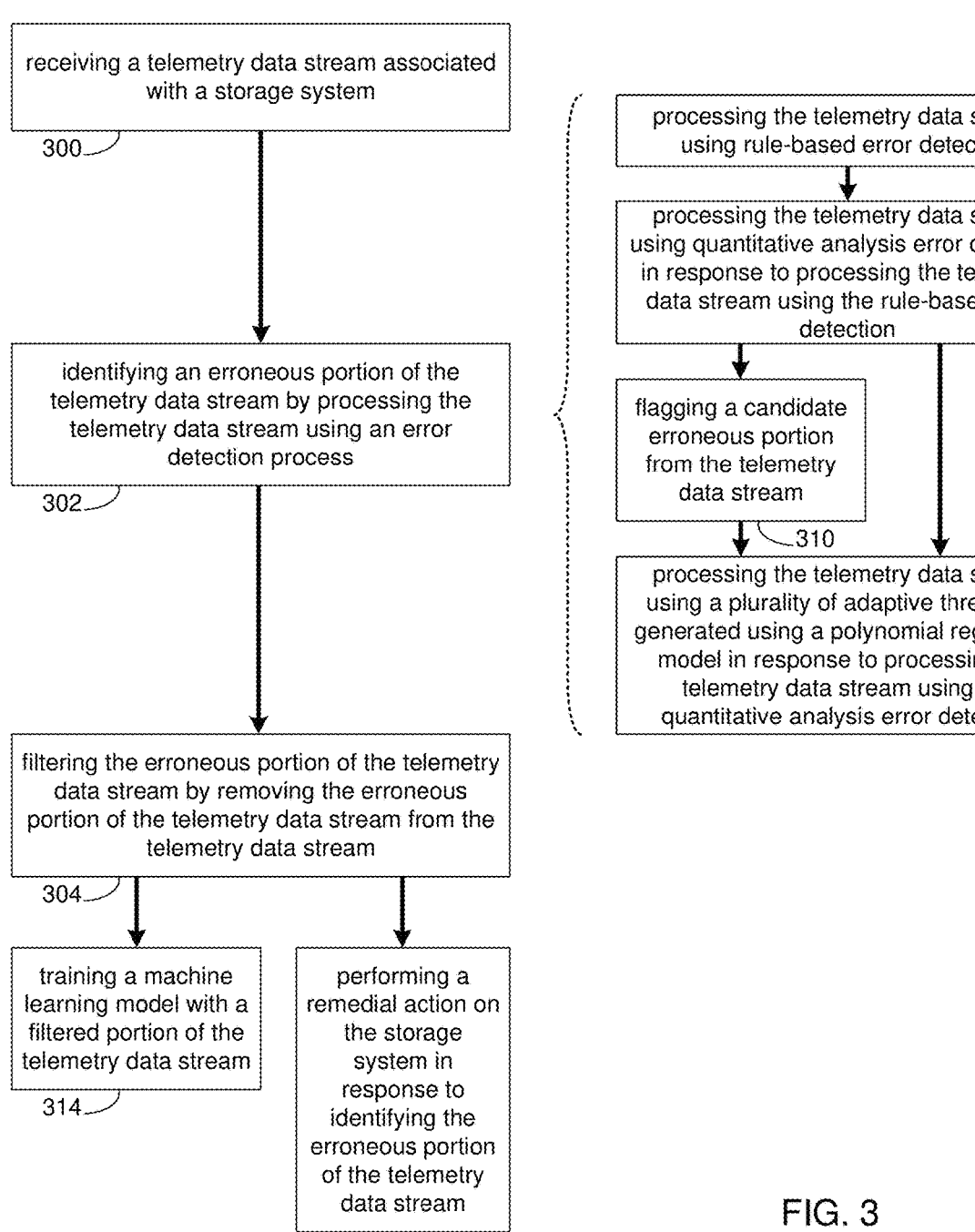

receiving a telemetry data stream associated with a storage system

300 identifying an erroneous portion of the telemetry data stream by processing the telemetry data stream using an error detection process

302 filtering the erroneous portion of the telemetry data stream by removing the erroneous portion of the telemetry data stream from the telemetry data stream

304 training a machine learning model with a filtered portion of the telemetry data stream

314 performing a remedial action on the storage system in response to identifying the erroneous portion of the telemetry data stream

316 processing the telemetry data stream using rule-based error detection

306 processing the telemetry data stream using quantitative analysis error detection in response to processing the telemetry data stream using the rule-based error detection

308 flagging a candidate erroneous portion from the telemetry data stream

310 processing the telemetry data stream using a plurality of adaptive thresholds generated using a polynomial regression model in response to processing the telemetry data stream using the quantitative analysis error detection

SYSTEM AND METHOD FOR DETECTING AND FILTERING HARMFUL AND INCORRECT DATA FROM TELEMETRY STREAMS

BACKGROUND

Modern enterprise information technology (IT) systems play a critical role in the functioning of businesses across various industries. These systems continuously generate vast amount of telemetry data, which is used to provide valuable insights into the health and performance of IT systems in the field and to build in machine learning/artificial intelligence (AI) capabilities for these products.

However, with the increasing volume and complexity of the data that is being processed, there is a growing concern about the quality and integrity of the incoming data streams. Real life experience shows that telemetry data quality can be poor, due to hardware problems, software bugs, instrumentation, and configuration issues and/or other human errors, data corruption, and parsing errors, among others. Such data corruption can compromise the overall functioning and reliability of any analytics or machine learning/AI solution based on this data.

SUMMARY OF DISCLOSURE

In one example implementation, a computer-implemented method executed on a computing device may include, but is not limited to, receiving a telemetry data stream associated with a storage system. An erroneous portion of the telemetry data stream is identified by processing the telemetry data stream using an error detection process. The erroneous portion of the telemetry data stream is filtered by removing the erroneous portion of the telemetry data stream from the telemetry data stream.

One or more of the following example features may be included. Identifying the erroneous portion of the telemetry data stream may include processing the telemetry data stream using rule-based error detection. Identifying the erroneous portion of the telemetry data stream may include processing the telemetry data stream using quantitative analysis error detection in response to processing the telemetry data stream using the rule-based error detection. Processing the telemetry data stream using quantitative analysis error detection may include flagging a candidate erroneous portion from the telemetry data stream. Identifying the erroneous portion of the telemetry data stream may include processing the telemetry data stream using a plurality of adaptive thresholds generated using a polynomial regression model in response to processing the telemetry data stream using the quantitative analysis error detection. A remedial action may be performed on the storage system in response to identifying the erroneous portion of the telemetry data stream. A machine learning model may be trained with a filtered portion of the telemetry data stream.

In another example implementation, a computer program product resides on a computer readable medium that has a plurality of instructions stored on it. When executed by a processor, the instructions cause the processor to perform operations that may include, but are not limited to, receiving a telemetry data stream associated with a storage system. An erroneous portion of the telemetry data stream is identified by processing the telemetry data stream using an error detection process. The erroneous portion of the telemetry data stream is filtered by removing the erroneous portion of the telemetry data stream from the telemetry data stream.

One or more of the following example features may be included. Identifying the erroneous portion of the telemetry data stream may include processing the telemetry data stream using rule-based error detection. Identifying the erroneous portion of the telemetry data stream may include processing the telemetry data stream using quantitative analysis error detection in response to processing the telemetry data stream using the rule-based error detection. Processing the telemetry data stream using quantitative analysis error detection may include flagging a candidate erroneous portion from the telemetry data stream. Identifying the erroneous portion of the telemetry data stream may include processing the telemetry data stream using a plurality of adaptive thresholds generated using a polynomial regression model in response to processing the telemetry data stream using the quantitative analysis error detection. A remedial action may be performed on the storage system in response to identifying the erroneous portion of the telemetry data stream. A machine learning model may be trained with a filtered portion of the telemetry data stream.

In another example implementation, a computing system includes at least one processor and at least one memory architecture coupled with the at least one processor, wherein the at least one processor is configured to receive a telemetry data stream associated with a storage system. An erroneous portion of the telemetry data stream is identified by processing the telemetry data stream using an error detection process. The erroneous portion of the telemetry data stream is filtered by removing the erroneous portion of the telemetry data stream from the telemetry data stream.

One or more of the following example features may be included. Identifying the erroneous portion of the telemetry data stream may include processing the telemetry data stream using rule-based error detection. Identifying the erroneous portion of the telemetry data stream may include processing the telemetry data stream using quantitative analysis error detection in response to processing the telemetry data stream using the rule-based error detection. Processing the telemetry data stream using quantitative analysis error detection may include flagging a candidate erroneous portion from the telemetry data stream. Identifying the erroneous portion of the telemetry data stream may include processing the telemetry data stream using a plurality of adaptive thresholds generated using a polynomial regression model in response to processing the telemetry data stream using the quantitative analysis error detection. A remedial action may be performed on the storage system in response to identifying the erroneous portion of the telemetry data stream. A machine learning model may be trained with a filtered portion of the telemetry data stream.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 3 is an example flowchart of error detection process according to one or more example implementations of the disclosure;

Like reference symbols in the various drawings indicate like elements.

DETAILED DESCRIPTION

Figure 1:
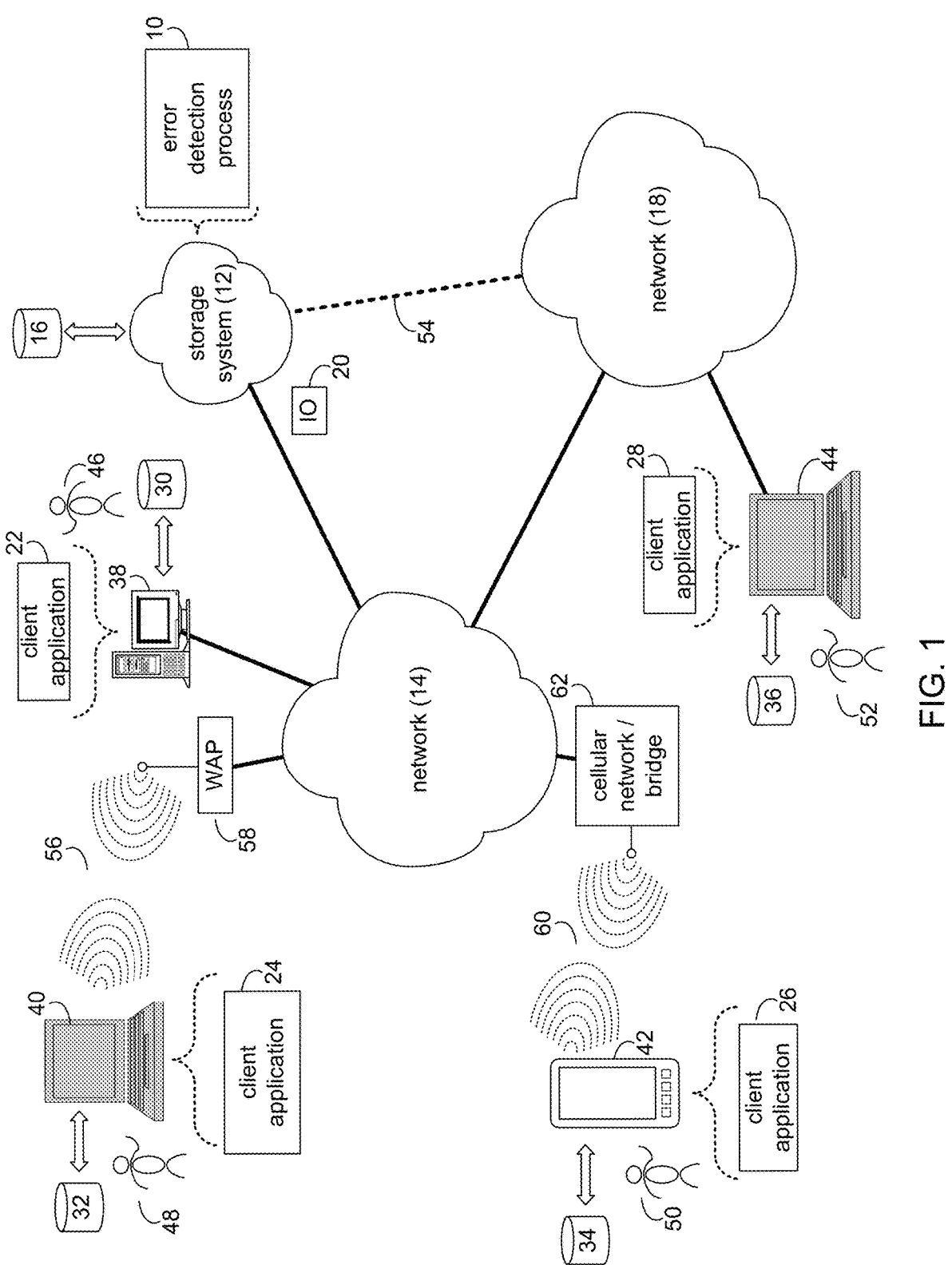
FIG. 1 is an example diagrammatic view of a storage system and an error detection process coupled to a distributed computing network according to one or more example implementations of the disclosure.

System Overview:

Referring to FIG. 1, there is shown error detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of error detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of error detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a error detection process, such as error detection process 10 of FIG. 1, may include but is not limited to, receiving a telemetry data stream associated with a storage system. An erroneous portion of the telemetry data stream is identified by processing the telemetry data stream using an error detection process. The erroneous portion of the telemetry data stream is filtered by removing the erroneous portion of the telemetry data stream from the telemetry data stream.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
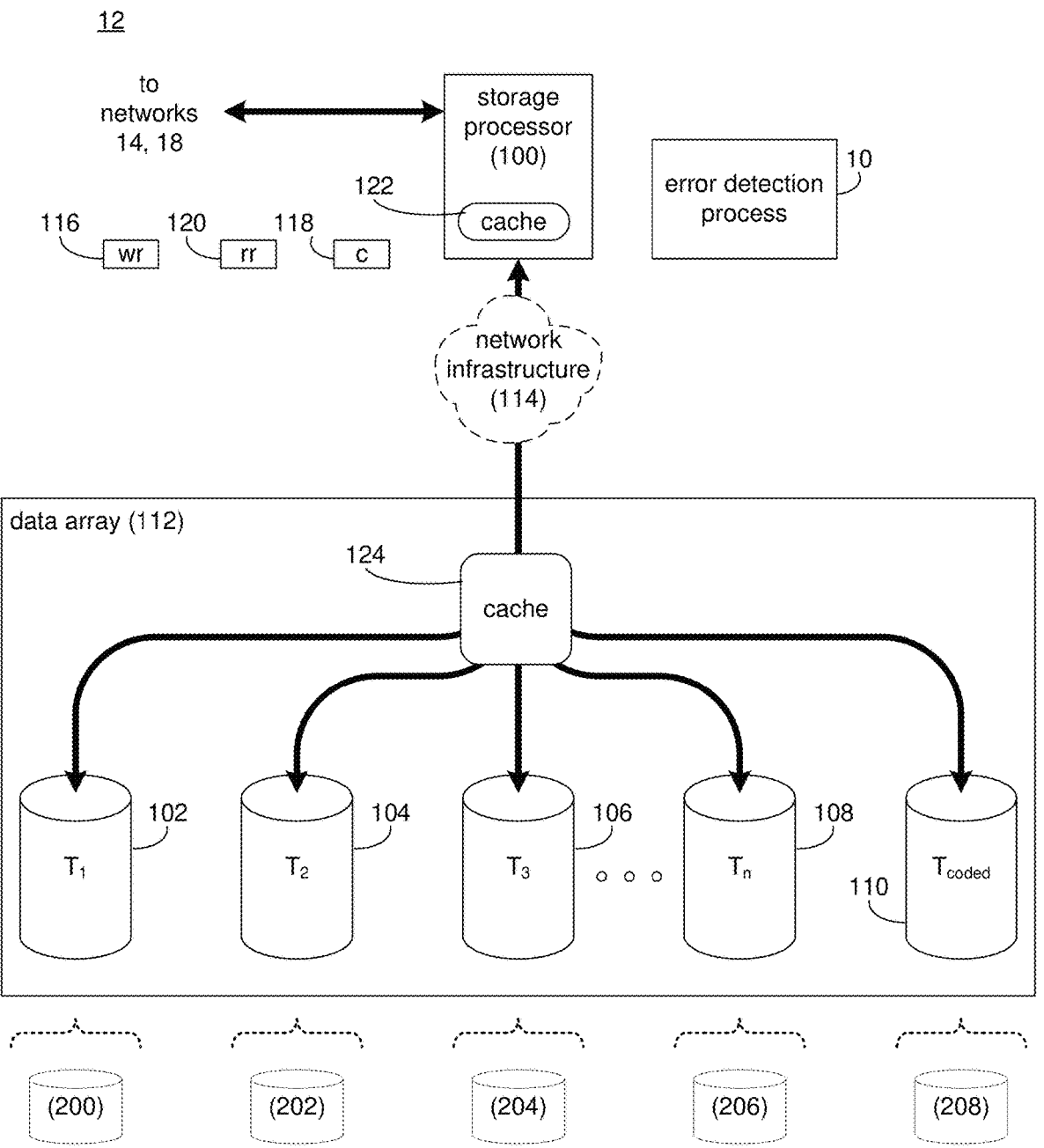
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of error detection process 10. The instruction sets and subroutines of error detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of error detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of error detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of error detection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 4:
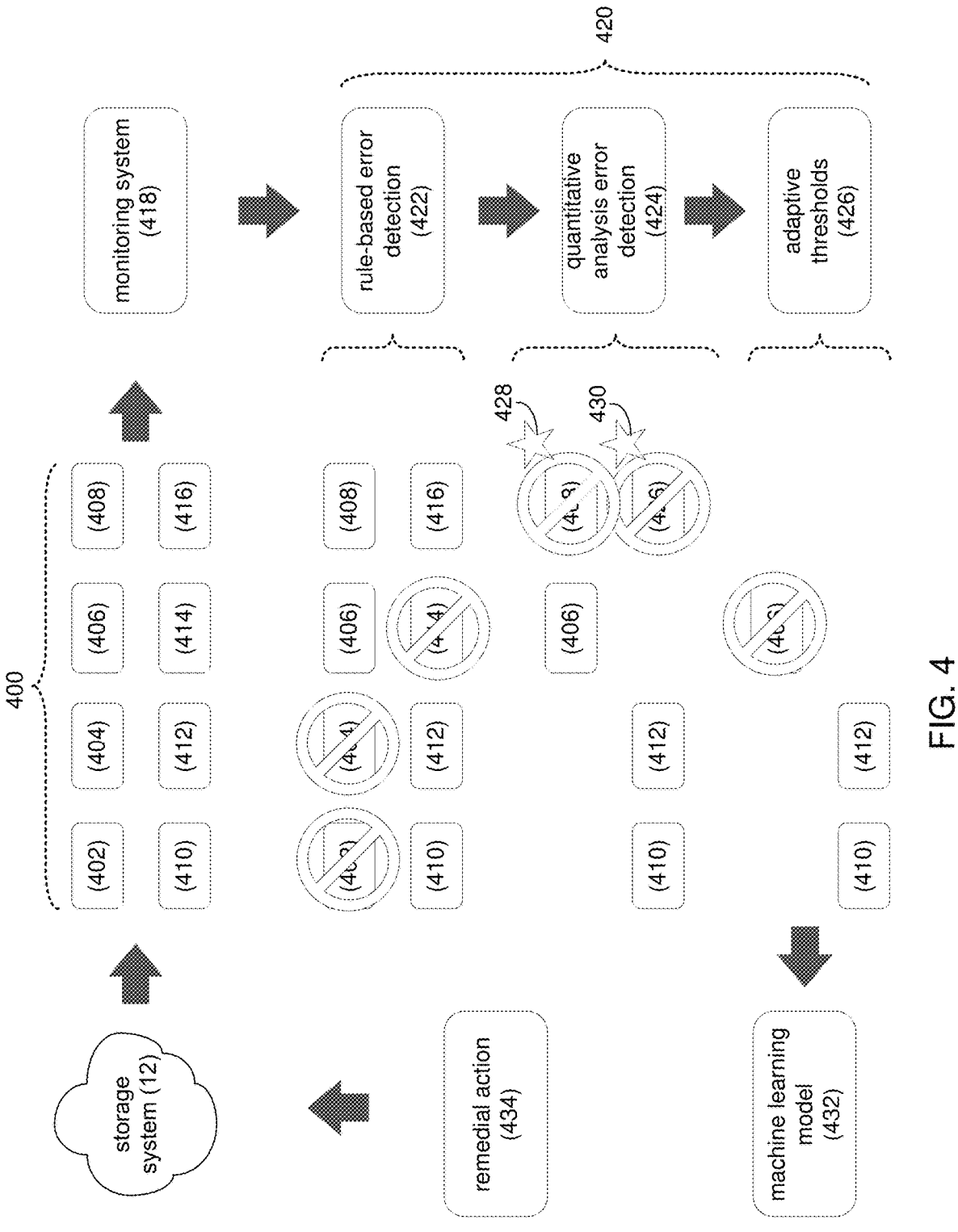
FIG. 4 is an example diagrammatic view of the error detection process according to one or more example implementations of the disclosure.
Figure 5:
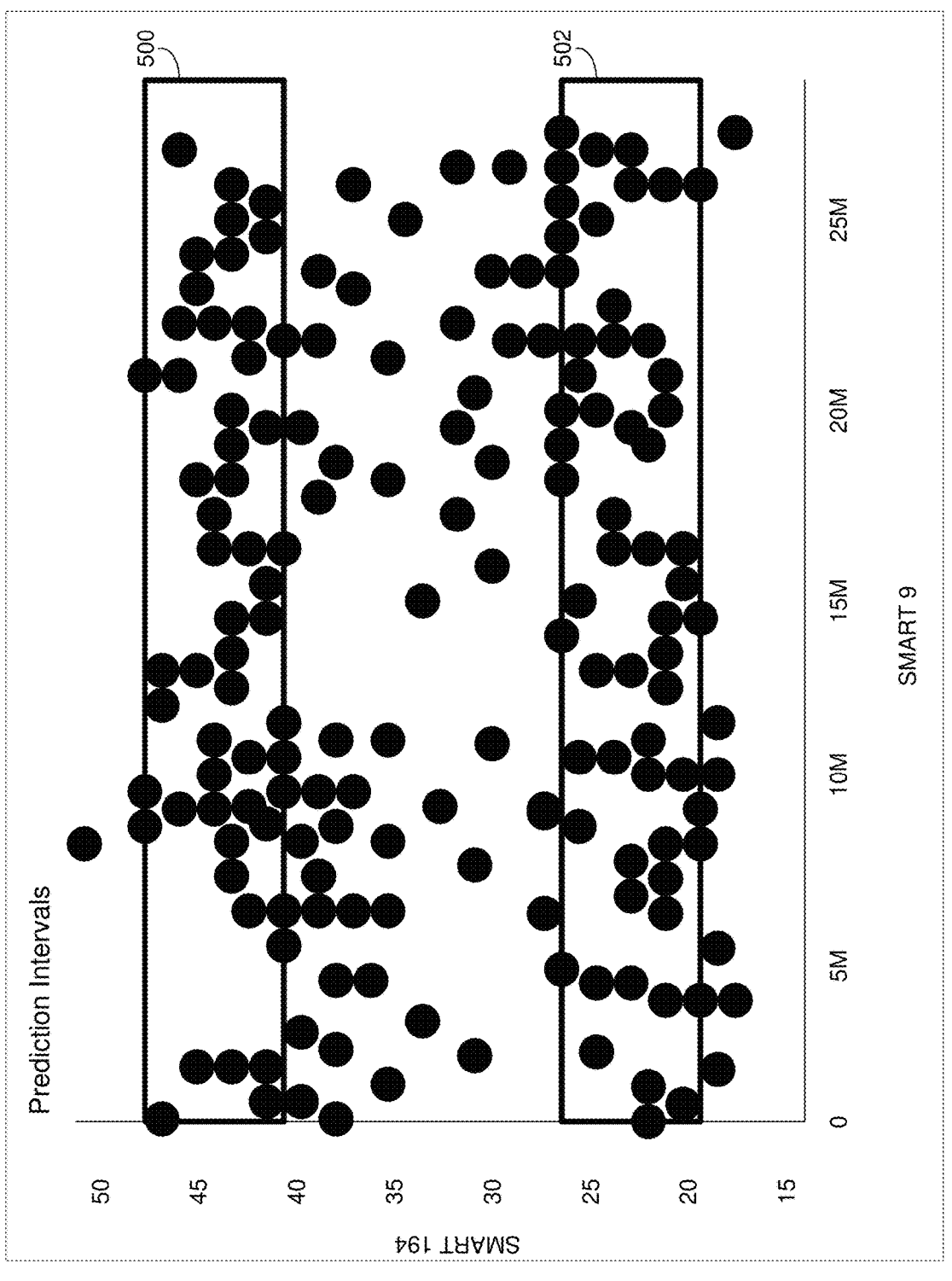
FIG. 5 is an example diagrammatic view of adaptive thresholds generated according to one or more example implementations of the disclosure.

The Error Detection Process:

Referring also to the examples of FIGS. 3-5 and in some implementations, error detection process 10 may receive 300 a telemetry data stream associated with a storage system. An erroneous portion of the telemetry data stream is identified 302 by processing the telemetry data stream using an error detection process. The erroneous portion of the telemetry data stream is filtered 304 by removing the erroneous portion of the telemetry data stream from the telemetry data stream.

As will be discussed in greater detail below, implementations of the present disclosure provide a comprehensive solution for checking and filtering incoming data for enterprise IT utilizing a combination of rule-based error alerts, quantitative error detections, and adaptive thresholds to ensure the integrity and sanity of the data.

In some implementations, error detection process 10 receives 300 a telemetry data stream associated with a storage system. For example, during the operation of a storage system (e.g., storage system 12), various components of storage system 12 generates telemetry data. Referring also to FIG. 4, telemetry data (telemetry data 400) includes automatically collected log, metrics, events, and traces from sensors and/or monitoring components of the storage system. In some implementations, telemetry data 400 includes various portions (e.g., portions 402, 404, 406, 408, 410, 412, 414, 416). In this example, portions 402, 404, 406, 408, 410, 412, 414, 416 represent unique logging events. For instance, portions 402, 404, 406, 408 represent Self-Monitoring, Analysis, and Reporting Technology (SMART) data generated by storage devices (e.g., hard disk drive (HDD) and solid-state drive (SSD) storage devices) and provided to a monitoring system (e.g., monitoring system 418). Monitoring system 418 includes a platform or service deployed locally and/or remotely from storage system 12 that processes each portion of telemetry data stream 400 and provides portions of the telemetry data stream for training machine learning models, for analysis by automated and manual processes, and/or for generating and executing remedial actions on the storage system.

In some implementations, error detection process 10 identifies 302 an erroneous portion of the telemetry data stream by processing the telemetry data stream using an error detection process. An erroneous portion is a subset of telemetry data 400 that represents a portion of telemetry data 400 that does not meet an expected criteria for that portion of the telemetry data. An error detection process (e.g., error detection process 420) includes an automated methodology or approach for processing telemetry data 400 and filtering and/or flagging specific portions of telemetry data 400 for subsequent processing or analysis. In one example, error detection process 420 includes various automated methodologies that form a processing flow from a rule-based error detection approach (e.g., rule-based error detection 422), a quantitative analysis error detection approach (e.g., quantitative analysis error detection 424), to an adaptive threshold error detection approach (e.g., adaptive thresholds 426). Accordingly and in this example, error detection process 400 sequentially processes telemetry data 400 through each approach.

In another example, error detection process 10 determines an error detection process approach to use for processing telemetry data 400. In this example, certain types or portions of telemetry data 400 are processed using particular approached. In one example, certain SMART data is processed by rule-based error detection 422 while other SMART data is processed by quantitative analysis error detection 424. In another example, error detection process 10 applies additional error detection approaches in response to the results of an initial or first error detection approach. For example, and in response to identifying a threshold amount or predefined type of error from rule-based error detection 422, error detection process 10 processes telemetry data 400 using quantitative analysis error detection 424. Similarly and in another example, error detection process 10 processes telemetry data 400 using quantitative analysis error detection 424 and, in responses to identifying a threshold amount or predefined type of error, processes the telemetry data using adaptive thresholds 430. Accordingly, it will be appreciated that various error detection processes may be used to identify erroneous portions of telemetry data 400 within the scope of the present disclosure.

In some implementations, identifying 302 the erroneous portion of the telemetry data stream includes processing 306 the telemetry data stream using rule-based error detection. For example, rule-based error detection 422 includes a plurality of predefined rules and logic that encompass data type integrity constraints and legal bounds. In one example, rule-based error detection 422 includes validating the data type (int/float/char etc.) and checking data values from telemetry data 400 against fixed rules derived from existing standards for each component in storage system 12. In some implementations, rule-based error detection 422 is designed to inspect incoming data and verify each data attribute has the correct type, as defined in the respective standards. In one example, rule-based error detection 422 includes rules concerning SMART attributes used in disk failure forecasting. In some implementations, portions of telemetry data 400 for which the data has the wrong type are identified and (as will be discussed in greater detail below) removed, ensuring that only accurate and reliable information is processed further down the pipeline. Referring again to FIG. 4 and in one example, error detection process 10 identifies erroneous portions in portions 402, 404, and 414 of telemetry data 400 by processing telemetry data 400 with the predefined rule sets of rule-based error detection 422. In this example, error detection process 10 identifies portions 402,

404, and 414 as erroneous because each portion does not include a respective correct data type. By implementing rule-based error detection our solution can quickly identify and flag any data that does not meet the expected criteria.

For the example shown in Table 1 below, showing only a subset of the relevant attributes, a total of 95,417,354 samples are analyzed from a real-world dataset.

TABLE 1

| Telemetry Data Attribute | Samples - Passing | Samples - Failing | % Passing | % Failing |
|---|---|---|---|---|
| SMART 5 | 43,590,464 | 51,826,890 | 45.68% | 54.32% |
| SMART 187 | 71,178,579 | 24,238,775 | 74.6% | 25.4% |
| SMART 188 | 77,859,034 | 17,558,320 | 81.6% | 18.4% |
| SMART 194 | 81,594,633 | 13,822,721 | 85.51% | 14.49% |

In some implementations, identifying 302 the erroneous portion of the telemetry data stream includes processing 308 the telemetry data stream using quantitative analysis error detection in response to processing the telemetry data stream using the rule-based error detection. For example, quantitative analysis error detection 424 is a hardware and/or software component that analyzes and validates various metrics of the telemetry data by applying statistical analysis and outlier detection methods (i.e., expressions based on grouping operations, frequency analysis, and/or Z-scores) on the entire dataset in order to determine the accuracy and validity of the data.

Referring again to FIG. 4 and in one example, error detection process 10 identifies erroneous portions in portions 408 and 416 of telemetry data 400 by processing telemetry data 400 with the quantitative analysis expressions of quantitative analysis error detection 424. In this example, error detection process 10 identifies portions 408 and 416 as erroneous because each portion is statistically inconsistent with the respective telemetry data attribute (i.e., portions 408 and 416 were outlier portions of telemetry 400 that are outside of a predefined or statistically-generated range of values for the respective telemetry data attribute).

Table 2 below shows observations passed in one example as input from the rule-based checker component.

TABLE 2

| Telemetry Data Attribute | Samples - Passing | Samples - Failing | % Passing | % Failing |
|---|---|---|---|---|
| SMART 12 | 41,707,356 | 1,883,108 | 95.68% | 4.32% |
| SMART 187 | 68,886,629 | 2,291,950 | 96.78% | 25.4% |
| SMART 188 | 76,153,921 | 1,705,113 | 97.81% | 2.19% |
| SMART 194 | 75,532,152 | 6,062,481 | 92.57% | 7.43% |

In some implementations, processing 308 the telemetry data stream using quantitative analysis error detection includes flagging 310 a candidate erroneous portion from the telemetry data stream. For example, in addition to, or instead of filtering the identified erroneous portions from telemetry data 400, error detection process 10 flags 310 candidate erroneous portions from telemetry data stream 400. Flagging the candidate erroneous portion includes marking or labeling portions of the telemetry data stream that are inconsistent with their respective telemetry data attribute. For instance, candidate erroneous portions include erroneous portions 408 and 416 as discussed above which are flagged 310 (e.g., with flags 428, 430) for further analysis. In this example, erroneous portions 408 and 416 are removed from telemetry data 400 and flagged for further analysis (e.g., by a user or by another process (e.g., a machine learning model)). In another example, candidate erroneous portions are portions that have a first threshold inconsistency for a respective telemetry data attribute while erroneous portions that are removed have a higher, second threshold inconsistency relative to the respective telemetry data attribute. In this example, error detection process 10 performs quantitative analysis and determines that portions 408 and 416 have at least the first threshold inconsistency and flags 310 them as candidate erroneous portions for further processing. In this manner, quantitative analysis error detection 424 identifies portions that fail to match the statistical consistency of the data for a respective telemetry data attribute, allowing for quick identification and resolution of data issues.

In some implementations, identifying 302 the erroneous portion of the telemetry data stream includes processing 312 the telemetry data stream using a plurality of adaptive thresholds generated using a polynomial regression model in response to processing the telemetry data stream using the quantitative analysis error detection. For example, portions of telemetry data that pass both rule-based error detection 422 and quantitative analysis error detection 424 are passed as input to adaptive thresholds 426. In some implementations, adaptive thresholds 426 represents a hardware and/or software component that is designed to verify the correctness of the telemetry data by utilizing adaptive thresholds generated through a polynomial regression model. For example, bounds are defined for each attribute based on the model results and the relevant prediction interval. This is shown below in Equation 1:

$$\text{Prediction interval} = \text{sample estimate} \pm (t - \text{multiplier} * \text{standard error}) \quad (1)$$

This is shown in formula notation in Equation 2:

$$Y_{new} = y_h \pm t_{(1-\alpha/2, n-2)} * \sqrt{MSE * \left(1 + \left(\frac{1}{n}\right) + \frac{(x_h - x)2}{\sum (x_i - x)2}\right)} \quad (2)$$

where $y_h$ is the fitted value or predicted value, $t_{(1-\alpha/2,\, n-2)}$ is the t-multiplier, and $$\sqrt{MSE * \left(1 + \left(\frac{1}{n}\right) + \frac{(x_h - x)2}{\sum (x_i - x)2}\right)}$$

is the standard error of the prediction.

Referring also to FIG. 5 and in some implementations, error detection process 10 processes telemetry data 400 to generate a plurality of prediction intervals. For example, error detection process 10 generates an upper bounds regression (e.g., upper bounds 500) and lower bounds regression (e.g., lower bounds 502) for predictive intervals generated for two telemetry data attributes (e.g., SMART 9 and SMART 194, in this example). Using such adaptive thresholds/intervals, error detection process 10 identifies erroneous portions (e.g., portion 406) from telemetry data 400. Table 3 below shows the identification of telemetry data portions that are erroneous using adaptive thresholds 426:

TABLE 3

| Telemetry Data Attribute | Samples - Passing | Samples - Failing | % Passing | % Failing |
|---|---|---|---|---|
| SMART 12 | 41,192,270 | 515,086 | 98.76% | 1.24% |
| SMART 187 | 68,257,350 | 629,279 | 99.08% | 0.92% |
| SMART 188 | 75,570,963 | 582,958 | 99.23% | 0.77% |
| SMART 194 | 74,431,649 | 1,100,503 | 98.54% | 1.46% |

In some implementations, error detection process 10 filters 304 the erroneous portion of the telemetry data stream by removing the erroneous portion of the telemetry data stream from the telemetry data stream. For example and as shown in FIG. 4, with each error detection process approach (e.g., rule-based error detection 422, quantitative analysis error detection 424, and/or adaptive thresholds 426), error detection process 10 filters 304 erroneous portions (e.g., 402, 404, 406, 408, 414, and 416) from telemetry data stream 400 by removing each erroneous portion. In this manner, error detection process 10 removes erroneous portions from the telemetry data for processing by other systems. Referring to Table 4 below, implementations of the error detection process 10 identify a plurality of erroneous portions of telemetry data which are removed from subsequent processing.

TABLE 4

| Telemetry Data Attribute | Rule-based Error Detection | Quantitative Analysis Error Detection | Adaptive Thresholds | Valid Observations |
|---|---|---|---|---|
| SMART 12 | 54.32% | 1.97% | 0.54% | 43.17% |
| SMART 187 | 25.40% | 2.40% | 0.66% | 71.54% |
| SMART 188 | 18.40% | 1.79% | 0.61% | 79.20% |
| SMART 194 | 14.49% | 6.35% | 1.15% | 78.01% |

As shown above, the combination of rule-based error detection, quantitative analysis error detection, and adaptive thresholds, identify many erroneous portions from telemetry data 400. In this manner, error detection process 10 is able to detect and remove erroneous telemetry data in real-time.

In some implementations, error detection process 10 trains 314 a machine learning model with a filtered portion of the telemetry data stream. For example, using filtered portions (e.g., portions 410 and 412), error detection process 10 trains 314 a machine learning model (e.g., machine learning model 432) for performing remedial actions on storage system 12. Without such filtering, machine learning model 432 may be prone to errors by including inaccurate or inconsistent telemetry data (i.e., telemetry data that is inconsistent for a particular telemetry data attribute). Accordingly, with filtered portions 410 and 412, machine learning model 432 is trained with automatically filtered telemetry data for maintaining storage system 12.

In some implementations, error detection process 10 performs 316 a remedial action on the storage system in response to identifying the erroneous portion of the telemetry data stream. For example, remedial actions (e.g., remedial action 434) may generally include various operations or actions that can be performed on storage system 12. In one example, remedial action 434 includes actions concerning the updating of firmware or software of components of storage system 12 based upon telemetry data 400. In another example, remedial action 434 includes actions concerning the operation of particular storage devices (e.g., the enabling or disabling of storage devices, the alerting of a storage system administrator of the issues with a storage device, an alert for users of storage system 12, etc.). In another example, remedial action 434 includes generating a plurality of recommendations for a user of storage system 12 to implement to resolve issues noted in telemetry data 400. Accordingly, it will be appreciated that various remedial actions may be performed within the scope of the present disclosure.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

receiving a telemetry data stream associated with a storage system;

identifying an erroneous portion of the telemetry data stream by processing the telemetry data stream using an error detection process, wherein identifying the erroneous portion of the telemetry data stream includes:

processing the telemetry data stream using rule-based error detection;

processing the telemetry data stream using quantitative analysis error detection in response to processing the telemetry data stream using the rule-based error detection; and processing the telemetry data stream using a plurality of adaptive thresholds generated using a polynomial regression model in response to processing the telemetry data stream using the quantitative analysis error detection; and filtering the erroneous portion of the telemetry data stream by removing the erroneous portion of the telemetry data stream from the telemetry data stream.

2. The computer-implemented method of claim 1, wherein processing the telemetry data stream using quantitative analysis error detection includes flagging a candidate erroneous portion from the telemetry data stream.

3. The computer-implemented method of claim 1, further comprising:

performing a remedial action on the storage system in response to identifying the erroneous portion of the telemetry data stream.

4. The computer-implemented method of claim 1, further comprising:

training a machine learning model with a filtered portion of the telemetry data stream.

5. A computer program product comprising a non-transitory computer readable medium having a plurality of instructions stored thereon which, when executed by a processor, cause the processor to perform operations comprising:

receiving a telemetry data stream associated with a storage system;

identifying an erroneous portion of the telemetry data stream by processing the telemetry data stream using an error detection process, wherein identifying the erroneous portion of the telemetry data stream includes:

processing the telemetry data stream using rule-based error detection;

processing the telemetry data stream using quantitative analysis error detection in response to processing the telemetry data stream using the rule-based error detection; and processing the telemetry data stream using a plurality of adaptive thresholds generated using a polynomial regression model in response to processing the telemetry data stream using the quantitative analysis error detection; and filtering the erroneous portion of the telemetry data stream by removing the erroneous portion of the telemetry data stream from the telemetry data stream.

6. The computer program product of claim 5, wherein processing the telemetry data stream using quantitative analysis error detection includes flagging a candidate erroneous portion from the telemetry data stream.

7. The computer program product of claim 5, wherein operations further comprise:

performing a remedial action on the storage system in response to identifying the erroneous portion of the telemetry data stream.

8. The computer program product of claim 5, wherein the operations further comprise:

training a machine learning model with a filtered portion of the telemetry data stream.

9. A computing system comprising:

a memory; and a processor configured to:

receive a telemetry data stream associated with a storage system, identify an erroneous portion of the telemetry data stream by processing the telemetry data stream using an error detection process, wherein identifying the erroneous portion of the telemetry data stream includes:

processing the telemetry data stream using rule-based error detection;

processing the telemetry data stream using quantitative analysis error detection in response to processing the telemetry data stream using the rule-based error detection; and processing the telemetry data stream using a plurality of adaptive thresholds generated using a polynomial regression model in response to processing the telemetry data stream using the quantitative analysis error detection, and filter the erroneous portion of the telemetry data stream by removing the erroneous portion of the telemetry data stream from the telemetry data stream.

10. The computing system of claim 9, wherein the processor is further configured to:

perform a remedial action on the storage system in response to identifying the erroneous portion of the telemetry data stream.

11. The computing system of claim 9, wherein the processor is further configured to:

train a machine learning model with a filtered portion of the telemetry data stream.

* * * * *